Figure 1:
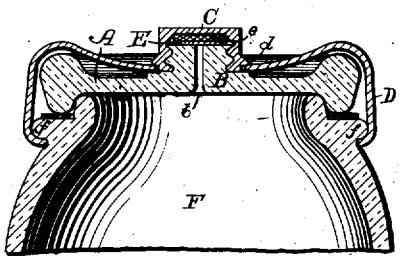

T. G. OTTERSON & C. C. VOORHIES.

GLASS CAN CAP.

No. 10,741. Reissued June 29, 1886.

*Witnesses*

F. G. Fischer

N. B. Wyman

*By his Attorney*

*Inventor*

Thomas G. Otterson
and
C. C. Voorhies

L. Deane.

UNITED STATES PATENT OFFICE.

THOMAS G. OTTERSON AND CORNELIUS C. VOORHIES, OF WOODBURY, N. J.

GLASS CAN-CAP.

SPECIFICATION forming part of Reissued Letters Patent No. 10,741, dated June 29, 1886.

Original No. 313,229, dated March 3, 1885. Application for reissue filed April 2, 1886. Serial No. 197,566.

*To all whom it may concern:*

Be it known that we, THOMAS G. OTTERSON and CORNELIUS C. VOORHIES, of Woodbury, in the county of Gloucester and State of New Jersey, have invented certain new and useful Improvements in Glass Can-Caps; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

The use of hermetically-sealed vessels for the preservation of fruits has caused a demand for special devices adapted to domestic use, and these devices consist, generally, in jars or cans with caps which can be removed intact and used again and again.

Our invention relates to that class of can or jar caps which are made of glass, and are secured in place by a yoke which passes over the cap or cover, and at its ends engages with inclined lugs on the exterior surface of the jar-neck. The easy and convenient manipulation of the cap or cover and yoke requires the yoke to be centered, so that it will revolve without cramping. When the yoke has more than two bearing-points on the neck of the jar, it will be efficiently centered by contact with the exterior surface of said neck; but yokes with more than two bearing-points are expensive. When there are only two points of engagement with the neck, as in our invention, then the yoke requires to be centered on the cap.

The successful preservation of food substances in hermetically-sealed vessels depends upon the exclusion of oxygen, and this is most readily accomplished by the generation of steam within the vessel to displace the atmospheric air. When such exclusion is complete, the vessel is sealed air-tight and permitted to cool. In order to permit the air and steam to escape, it is necessary that there shall be some means of outlet which can be quickly closed, and form a stop against the inlet of air afterward, and it is essential that the contents of the vessel shall not come in contact with any corrosible metal.

We are aware that glass caps have heretofore been made, and that yokes with only two bearing-points on the neck of the jar have heretofore been used and sometimes centered on the cap. We are also aware that caps have heretofore been made with valves both internal and external, and we do not claim, broadly, any of these features; but we are not aware that any one heretofore has combined together with a glass can-cap, the three features which we deem essential to a perfect closure—to wit, a yoke having a pivotal central bearing on the cap, a perforation or vent in the cap, and an exterior valve for the vent, whereby the yoke has when in use only two points of contact with the jar-neck, and the valve is not liable to corrosion by the contents of the vessel. Therefore our invention consists in a cap or cover having a perforation or vent and an external valve, and provided with a yoke centered on said cap or cover, its ends being adapted to engage the under surface of inclined lugs or oblique ribs on the exterior surface of the jar-neck at two points only.

Figure 2:
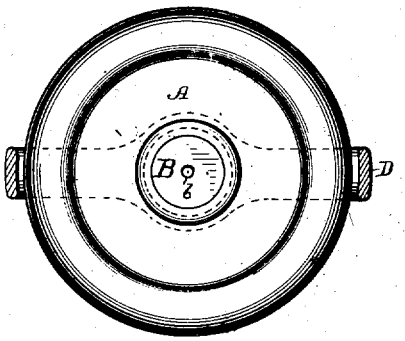
Figure 3:
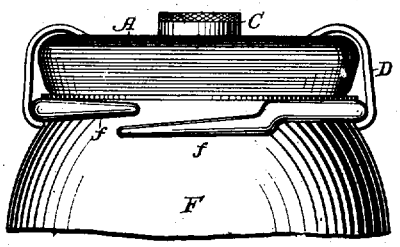

In the accompanying drawings, Figure 1 is a vertical section of a can cap or cover embodying our invention. Fig. 2 is plan view with the valve-cap, cushion, and valve removed. Fig. 3 is a side elevation showing the oblique ribs on the neck.

The construction of the cap, yoke, and jar is quite similar to that shown and described in Letters Patent No. 308,571, granted to Thomas G. Otterson and John H. Otterson, November 25, 1884.

A represents a glass cover or cap with a central perforation or vent, *b*, and an elevation around the vent to constitute a seat for the external valve, the packing whereof is interposed between the metallic valve-cap and the liquid contents of the can. The yoke D has only two points for engagement with the neck of the jar F—viz., one point on each of the oblique ribs *f*. It has also a bearing at *d* on the cap concentric with the center thereof to distribute equally to the edge of the same the pressure of the yoke; and it is also centered on said cap so as to rotate truly and easily without cramping. We have extended the valve-seat upward to constitute a central stud, B, to act as a pivot for the yoke D, and to prevent accidental displacement of the valve E by elevating and separating it from the yoke. We cover said valve with a cap, C, and provide inside of the same a circular piece of rubber, *e*, or equivalent elastic material, adapted to rest on the top of the stud in contact with the valve, and hold it down when the valve-cap is on the stud.

The valve E may be constructed in a variety of forms; but we prefer to employ a disk of rubber or other flexible material sufficiently small to rest within the valve-cap and completely close the opening in the stud.

The operation of the valve in practice is as follows: The jar is filled with the fruit to be preserved, the cover or cap is laid on, and the yoke placed on the stud and turned to draw the lid snugly down on the jar. The stud-cap is left off or loosened sufficiently to permit the steam to escape. The jar is then placed in water and the fruit heated to boiling. The steam escapes through the perforation in the stud, and when the air has been expelled the valve-cap is screwed on the stud and protects the valve against accidental displacement, and at the same time holds the yoke on the stud when the lid is removed to take out the fruit.

Having fully described our invention, what we claim as new, and desire to secure by Letters Patent, is—

1. In combination with a fruit-jar having oblique ribs on its neck, a cap centrally perforated, a yoke having a pivotal central bearing on said cap, and having only two points of engagement on the neck, and a valve closing over said perforation, substantially as described.

2. In combination, in a fruit-jar, a neck provided with external oblique ribs, a glass cover centrally perforated, a valve of elastic material, and a metallic cap to hold the same on and cover said perforation, and a yoke having a pivotal central bearing on said cover, and its ends adapted to engage said ribs at only two points, substantially as set forth.

3. A fruit-jar having inclined lugs, a cap centrally perforated, an external valve, a device for closing the valve by screw-pressure, and a yoke having a pivotal central bearing on said cap, and moving freely on said center bearing and at its ends engaging the lugs, substantially as described.

4. In a fruit-jar, the combination of the following elements, viz: a neck having oblique ribs, a cap provided with a central perforation, a rubber disk to cover said perforation, and a yoke having a pivotal central bearing on the cap, and having two points of engagement with the ribs on the neck, substantially as described.

5. The combination, with a lid or cover for jars, having an externally-screw-threaded stud, the latter being provided with a longitudinal perforation, of a valve resting on and closing the perforation in said stud, and a screw-threaded cap for holding the valve in place, substantially as set forth.

6. The combination, with the perforated stud and a yoke pivoted thereon, of a valve closing the perforation in the stud and performing the double function of protecting the valve and securing the yoke, substantially as set forth.

7. The combination, with a lid or cover for jars, having an externally-screw-threaded stud, the latter being provided with a longitudinal perforation, of a valve resting on and closing the perforation in said stud, a screw-threaded cap, and a cushion located within the cap and resting on the valve, substantially as set forth.

8. The combination, with the lid provided with a depressed central portion and a threaded stud located centrally therein, of the clamping-yoke journaled on the stud, a valve closing the perforation in the stud, and a cap screwed on the stud and securing the valve and yoke in position, substantially as set forth.

In testimony whereof we affix our signatures in presence of two witnesses.

THOMAS G. OTTERSON.
CORNELIUS C. VOORHIES.

Witnesses:
D. T. MATHERS,
GEO. H. BARKER.